May 18, 1943. J. BOLSEY 2,319,530
FILM MAGAZINE
Filed June 27, 1941 2 Sheets-Sheet 1
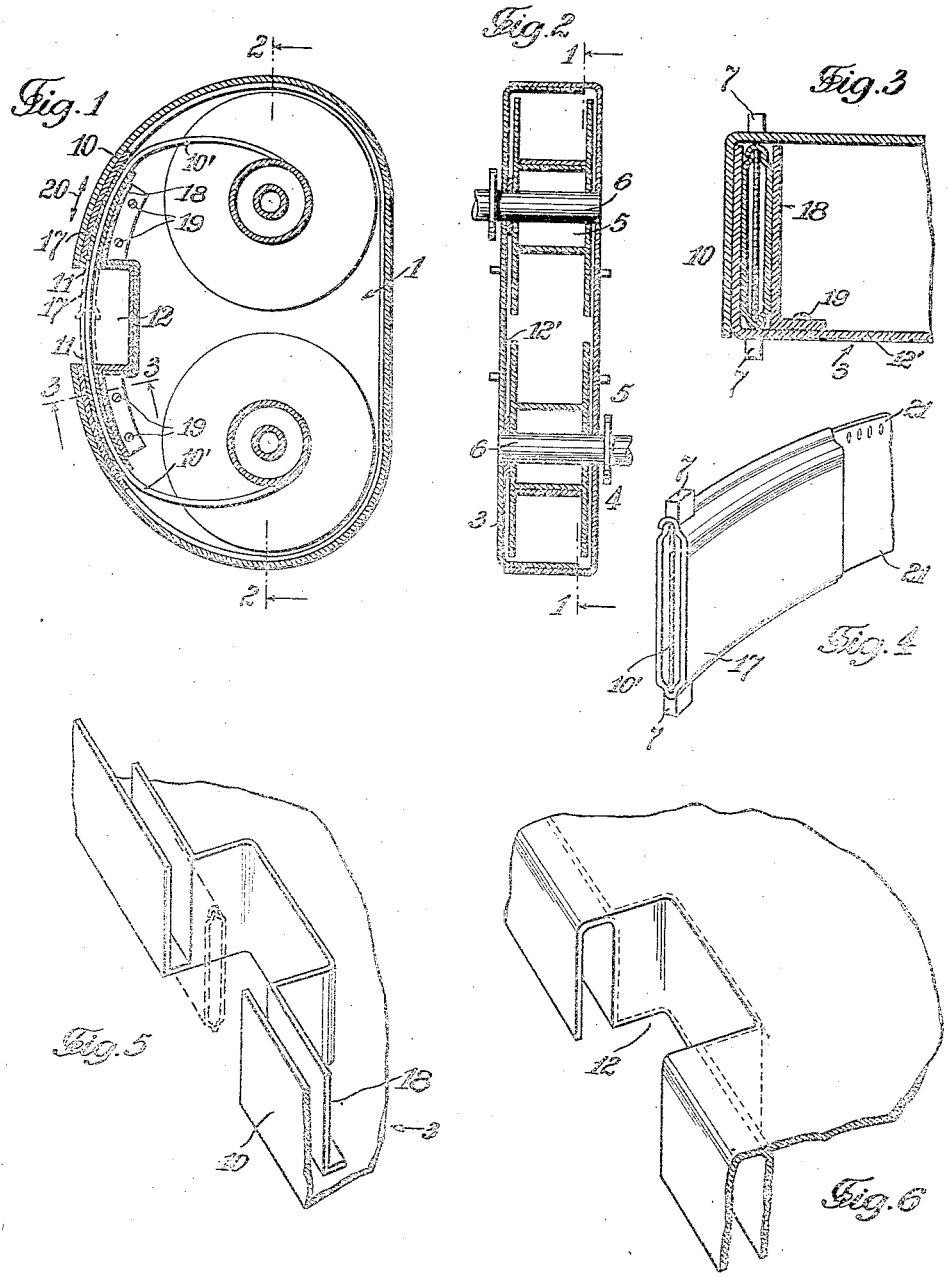
INVENTOR:
Jacques Bolsey May 18, 1943. J. BOLSEY 2,319,530
FILM MAGAZINE
Filed June 27, 1941 2 Sheets-Sheet 2
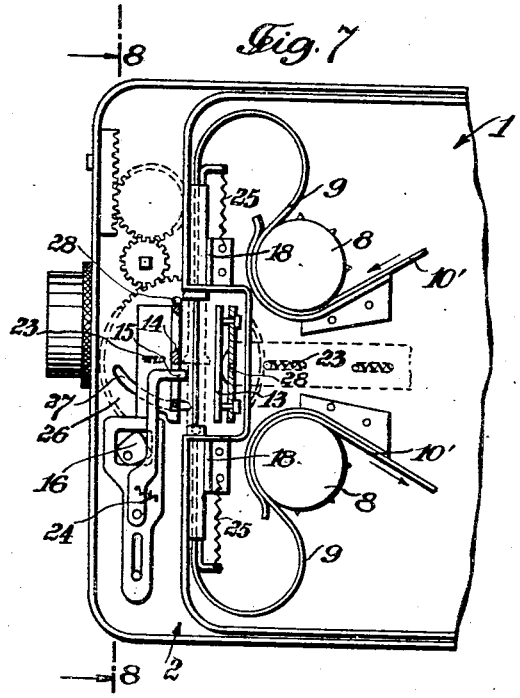
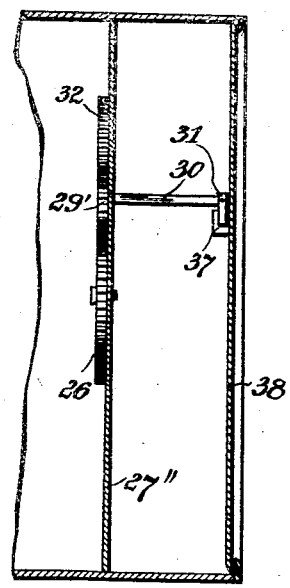
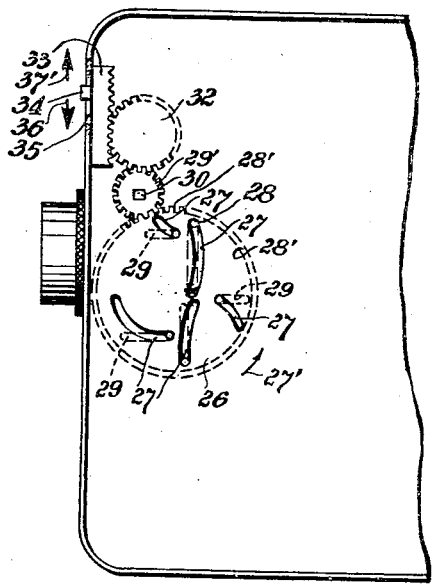
INVENTOR:
Jacques Bolsey
BY Patented May 18, 1943

2,319,530

UNITED STATES PATENT OFFICE 2,319,530

FILM MAGAZINE

Jacques Bolsey, New York, N. Y.

Application June 27, 1941, Serial No. 400,047

12 Claims. (Cl. 88—17)

My invention relates to improvements in motion picture cameras, and more particularly to film magazines for such cameras.

It is an object of my invention to provide in combination with the film magazine and the film feeding mechanism means adapted to enclose entirely the film portion, which is engaged by this film mechanism during the operation of the camera, when the camera casing is opened.

It is another object of my invention to combine this light-tight enclosing means with the film magazine in such a manner that it is operated automatically when the cover of the camera casing is opened or closed.

It is still another object of my invention to provide means by which the film feeding mechanism is automatically disengaged from the film when this film is enclosed within the light-tight enclosing means, and vice versa, the enclosing means are automatically removed when the film feeding mechanism engages the film.

With the above objects in view, my present invention consists mainly in a film magazine comprising a front wall provided with two apertures for the film moving between said apertures outside of said magazine along a straight film path and a wall portion between said apertures being at a certain distance from the straight path of the film between said apertures.

A preferred embodiment of this magazine comprises a front wall provided with two parallel slits arranged normal to the side walls of said magazine, and a receding front wall portion between said slits.

I propose to combine with this new film magazine one or more sleeve-shaped tubular members adapted to enclose entirely the film moving between the above described parallel slits in the front wall of the magazine; it must be noted that these tubular members are movable and can therefore be removed from the film path outside the film magazine, thereby releasing this film portion for engagement with the film feeding mechanism; if required, they are moved into operative enclosing position, enclosing entirely the film portion outside of the film magazine.

The novel features which I consider as characteristic for my invention are set forth in particular in the append claims. The invention itself, however, both as to its construction and its method of operation, together with additional objects and advantages thereof will be best understood from the following description of specific embodiments, when read in connection with the accompanying drawings, in which:

Fig. 1 is a cross-section of a film magazine, along line 1—1 of Fig. 2, with film reels;

Fig. 2 is a longitudinal section of the film magazine shown in Fig. 1, along line 2—2 of Fig. 1, without the film reels;

Fig. 3 is a cross-section of the film enclosing means along line 3—3 of Fig. 1;

Fig. 4 is a perspective view of an enclosing tubular member;

Figs. 5 and 6 are fragmentary perspective views of the magazine bottom and cover;

Fig. 7 is a plane view of a film camera with my new film magazine and the film feeding mechanism, without camera and magazine covers;

Fig. 8 is a fragmentay cross-section of the camera shown in Fig. 7, along line 8—8 of Fig. 7; and Fig. 9 is a fragmentary plane view of the camera shown in Fig. 7, without the film magazine.

As shown in the drawings, the film magazine 1 is arranged within the camera casing 2. This magazine 1 consists of a magazine bottom 3 and a magazine cover 4, sliding one into the other, as usual. The film reels 5 are rotatably supported inside of the magazine by shafts 6, one of which is driven by the film driving mechanism of the camera.

In the embodiment of my invention shown in Figs. 1 and 2 the film magazine contains only the film reels, while in the embodiment shown in Fig. 7 the magazine contains also sprockets 8 driven by the film driving mechanism and forming loops 9 between them and the film aperture.

In accordance with my present invention, the film magazine comprises a front wall 10 provided with two parallel slits 11, which are arranged normal to the side walls of the magazine; the portion of the front wall between these slits 11 recedes, forming thereby a free recess 12 between these slits.

The film 10' leaves the film magazine at one of the slits 11, passes along a straight film path through recess 12 and enters the film magazine at the other slit 11.

As shown in Fig. 7, this free film path is necessary for engagement of the film by the film feeding, i. e., transporting mechanism; this film feeding mechanism consists of pressure plate 13, aperture plate 14 and film claw 15 intermittently engaging film 10' while it moves between the slits; claw 15 is operated by a mechanism 16. The mode of operation of the pressure and aperture plates and of the film claw will not be described in detail as it is the usual one and well known to everybody skilled in this art.

It is evident that during operation of the camera the film portion between the slits must be free for engagement by the plates 13 and 14 and by the film claw 15; it is, however, also evident that when the camera cover is open the free film portion between the two slits should be protected from light, i. e., should be light-tightly enclosed.

In order to attain this object, I provide two flat sleeve-like tubular members 17, shown in perspective view in Fig. 4. These tubular members slide between the front wall 10 of the magazine bottom 3 and supporting walls 18 secured by screws 19 to side wall 12', as shown in Figs. 3 and 5. These supporting walls 18 are shaped similar to the front wall 10, i. e., in the embodiment shown in Fig. 1 they have an arcuate shape like the front wall and the tubular members 17 shown in this figure, while in the embodiment shown in Fig. 7 they are straight like the front wall and the tubular members shown there. The magazine cover is shaped as shown in Fig. 6, in order to form a light-tight seal all along recess 12.

The tubular members 17 are adapted to slide in longitudinal direction between front wall 10 and supporting walls 18, as indicated by arrow 20. In the position indicated in dotted lines in Figs. 1 and 7, the two front edges of the tubular sleeve-shaped members engage each other, forming a light-tight tubular enclosure for the film. In the position shown in full lines, these tubular members are retracted into the camera casing, forming thereby a free film portion between their front edges; this film portion can be engaged by the film feeding mechanism as shown in Fig. 7.

Although the shape of these tubular members may be varied to a great extent within the limits of my present invention, I have found it advantageous to shape them as shown in Figs. 3 and 4. A characteristic feature of this shape is that the film is guided only near its edges 21, while the film portion between the film perforations moves freely between and does not contact the two side walls 22 of the tubular member. Thus, scratching of the film portion destined for the pictures is avoided and satisfactory guiding of the film near the aperture plate guaranteed. As furthermore shown in Fig. 1, the front end of one tubular member 17 is wider than the front end of the other member, so that one of them partly slides over the other forming an absolutely light-tight connection between them.

Each of the tubular members is provided at its front end with pins 7; these pins enable moving of the member by hand, if required, and its automatic operation by the means described below in detail.

As mentioned above, it is important that the film feeding mechanism be disengaged when the tubular members 17 are moved toward each other. In order to enable this, I propose to provide operating means adapted to bring the pressure and the aperture plates and the film feeding claw into operative position when the sleeve-shaped tubular protecting members 17 are retracted into the film magazine and, vice versa, to disengage the pressure and aperture plates and the film claw when the members 17 are moved toward each other, enclosing thereby the free film portion. I may, however, provide also springs for moving each of the parts of the film feeding mechanism and members 17 automatically into one direction instead of moving each of them by hand from operative into inoperative position, and back.

Thus, for instance, I may arrange as shown in Fig. 7, springs 23 tending to press aperture plate 14 and pressure plate 13 against the free film portion between slits 11, and a spring 24 pressing film claw 15 against the film, as customary; the action of these springs 23 is complemented by the action of springs 25 tending to push the tubular members 17 out of the film magazine into their operative position, indicated in dotted lines.

It is evident that without any additional operating means these springs would work against each other, i. e., the pressure and aperture plates 13, 14, and the film claw 15, would tend to engage the film simultaneously with the closing of the tubular members 17. Therefore, I provide hand-operated means adapted to hold the pressure and aperture plates 13, 14 and film claw 15 in inoperative position when the tubular members 17 are allowed to move toward each other and to hold these tubular members within the film magazine when the pressure and aperture plates and the film claw are released into operative position.

These operating means may comprise a disk 26 provided with slots 27, cooperating with pins 28 secured to the pressure and aperture plates 13, 14, the claw 15, and the tubular enclosing members 17. Disk 26 is turnably journalled to partition plate 27'' as shown in Fig. 8. This partition plate is provided with slits 29 in direction of the movements which pins 28 are adapted to carry out during the movement of the respective members to which they are secured; the movement of each of these pins is a limited one due to the fact that each of the members to which they are fastened moves in one direction forward into operative, and back into inoperative position.

When disc 26 is in the position shown in Fig. 9, the tubular members 17 are pushed back into the position shown in Fig. 7, while pressure and aperture plates 13, 14, and film claw 15 engage the film. When disk 26 is turned in the direction indicated by arrow 27', the pins operating the tubular members, and thus these members themselves, are allowed to slide by action of springs 25 toward each other, thereby entirely enclosing the film, while the pins operating the film feeding mechanism are moved against the action of springs 23 and 24, away from the film path, thereby disengaging the pressure and aperture plates 13, 14 and the film claw 15 from the film.

In order to rotate disk 26 in direction of arrow 27', and back, I provide at least a portion of the periphery of disk 26 with teeth 26' meshing with pinion 29'; pinion 29' is fixed to shaft 30, carrying also the camera cover closing member 31; a further pinion 32 meshing with toothed rack 33 is arranged as shown in Fig. 9. Toothed rack 33 is provided with knob 34 projecting through a slit 35 of the camera casing.

The mode of operation of this operating device is the following: By pushing knob 34 in direction of arrow 36, disk 26 is moved in direction of arrow 27'. By movement of disk 26 the film feeding mechanism is disengaged and the sleeve-shaped tubular members are closed, as described above. Simultaneously, by rotation of gear 29' and shaft 30 the cover closing member 31 is turned, disengaging a corresponding hook-like member 37 secured to the camera cover 38, and this cover can be opened. Thus, at the same moment when the camera cover closing means are disengaged and the cover can be opened and thereby the interior of the camera can be exposed to light, the film is completely light-tight enclosed by the tubular protective member.

When it is desired to take pictures, the camera cover is put into its place and knob 34 pushed in direction of arrow 37'; thereby the camera cover is closed and simultaneously, by rotation of disk 26 into direction of arrow 27', the tubular protecting sleeves are pushed back into the camera magazine and the parts of the film feeding mechanism released for engagement with the film.

It will be understood that each of the elements described above, or two or more together, may also find a useful application in other types of film cameras differing from the types described above.

While I have illustrated and described the invention as embodied in film cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. A film magazine comprising a front wall provided with two apertures for the film moving between said apertures outside of said magazine along a straight film path, a wall portion between said apertures being at a certain distance from the straight path of the film between said apertures, and movable sleeve-shaped film guiding means adapted to slide in longitudinal direction of the film moving between said apertures and to form a light-tight enclosing tube between said apertures for the free film portion between said apertures, leaving a free space between said sleeve-shaped film guiding means and said wall portion between said apertures which is at a certain distance from the straight path of the film between said apertures.

2. A film magazine comprising a front wall provided with two parallel slits normal to the side walls of said magazine enabling exit and entry of a film moving between said slits, a receding wall portion between said slits, and a sleeve-shaped film guiding means adapted to slide in longitudinal direction of the film moving between said slits and to form a light-tight enclosing tube for the free film portion between said slits, leaving a free space between said sleeve-shaped film guiding means and said receding wall portion.

3. A film magazine comprising a front wall provided with two parallel slits normal to the side walls of said magazine enabling exit and entry of a film moving between said slits, a receding wall portion between said slits, and at least one sleeve-shaped tubular film guiding member adapted to slide in longitudinal direction of the film moving between said slits and to form a light-tight enclosing tube for the free film portion between said slits, leaving a free space between said sleeve-shaped tubular film guiding member and said receding wall portion.

4. A film magazine comprising a front wall provided with two parallel slits normal to the side walls of said magazine enabling exit and entry of a film moving between said slits, a receding wall portion between said slits, and at least one sleeve-shaped tubular film guiding member adapted to slide through said slits into and out of said magazine in longitudinal direction of the film moving between said slits and to form thereby a light-tight enclosing tube for the free film portion between said slits.

5. A film magazine comprising a front wall provided with two parallel slits normal to the side walls of said magazine enabling exit and entry of a film moving between said slits, a receding wall portion between said slits, and two substantially symmetrical sleeve-shaped tubular film guiding members adapted to slide through said slits into and out of said magazine in longitudinal direction of the film moving between said slits and to form thereby a light-tight enclosing tube for the free film portion between said slits.

6. A film magazine comprising a front wall provided with two parallel slits normal to the side walls of said magazine enabling exit and entry of a film moving between said slits, a receding wall portion between said slits, and at least one sleeve-shaped film guiding member adapted to slide through said slits into and out of said magazine in direction of the film moving between said slits and to form thereby a light-tight enclosing tube between said slits, said sleeve shaped film guiding member provided with at least one pin-shaped projection for moving said member.

7. A film magazine comprising a front wall provided with two parallel slits normal to the side walls of said magazine enabling exit and entry of a film moving between said slits, a receding wall portion between said slits, at least one sleeve-shaped film guiding member adapted to slide through said slits into and out of said magazine in direction of the film moving between said slits and to form thereby a light-tight enclosing tube between said slits, said sleeve-shaped film guiding member adapted to be moved from inoperative position inside of said magazine into operative position outside of it and spring-like means cooperating with said member and constantly tending to move the same from said inoperative into said operative position.

8. In a film camera in combination a camera casing, a removable film magazine comprising a front wall provided with two parallel slits normal to the side walls of said magazine enabling exit and entry of a film moving between said slits, a receding wall portion between said slits, a sleeve-shaped film guiding means adapted to slide in longitudinal direction of the film moving between said slits and to form a light-tight enclosing tube for the free film portion between said slits leaving a free space between said sleeve-shaped film guiding means and said receding wall portion, a pressure plate secured to said camera casing arranged behind the film within said free space between said receding wall portion and said sleeve-shaped film guiding means, an aperture plate arranged in front of said film cooperating with said pressure plate, and an intermittently moving film claw engaging said film when it is not enclosed by said tubular enclosing means.

9. In a film camera in combination a removable film magazine comprising a front wall provided with two parallel slits normal to the side walls of said magazine enabling exit and entry of a film moving between said slits, a receding wall portion between said slits, and at least one sleeve-shaped film guiding member adapted to slide through said slits into and out of said magazine in longitudinal direction of the film moving between said slits and to form a light-tight enclosing tube for the free film portion between said slits, a slidable pressure plate arranged behind the film in said recess, a slidable aperture plate arranged in front of said film cooperating with said pressure plate, and a turntable intermittently moving film claw engaging said film when it is not enclosed by said tubular enclosing means.

10. In combination with a film magazine and the film feeding means claimed in claim 9, means adapted to move simultaneously said sleeve-shaped film guiding member, said pressure and aperture plates, and said film claw at will of the operator of the camera.

11. In combination with a film magazine and the film feeding means claimed in claim 9, a camera cover, a member for closing and opening said camera cover, means cooperating with said camera cover closing and opening member, said means adapted to move simultaneously said sleeve-shaped film guiding member, said pressure and aperture plates, and said film claw at will of the operator of the camera in such a manner that the film portion between said slits is light-tightly enclosed at the same time when said pressure and aperture plates and said claw are moved out of contact with said free film portion, and vice versa.

12. In combination with a film magazine and the film feeding means claimed in claim 9, operating means including a rotatable disk provided with means adapted to engage said sleeve-shaped film guiding member, said pressure and aperture plates, and said film claw, and to move them simultaneously in such a manner that the film portion between said slits is light-tightly enclosed at the same time when said pressure and aperture plates and said claw are moved out of contact with said free film portion, and vice versa.

13. In combination with a film magazine and the film feeding means claimed in claim 9, a camera cover, a member for closing and opening said camera cover, means cooperating with said camera cover closing and opening member, said means including a rotatable disk provided with means adapted to engage said sleeve-shaped film guiding member, said pressure and aperture plates, and said film claw, and to move them simultaneously in such a manner that the film portion between said slits is light-tightly enclosed at the same time when said pressure and aperture plates and said claw are moved out of contact with said free film portion, and vice versa.

JACQUES BOLSEY.